March 26, 1946.  C. A. WIKEN ET AL  2,397,178
MACHINE TOOL SPINDLE MOUNTING AND LUBRICATION SYSTEM
Original Filed Dec. 1, 1942    2 Sheets-Sheet 1
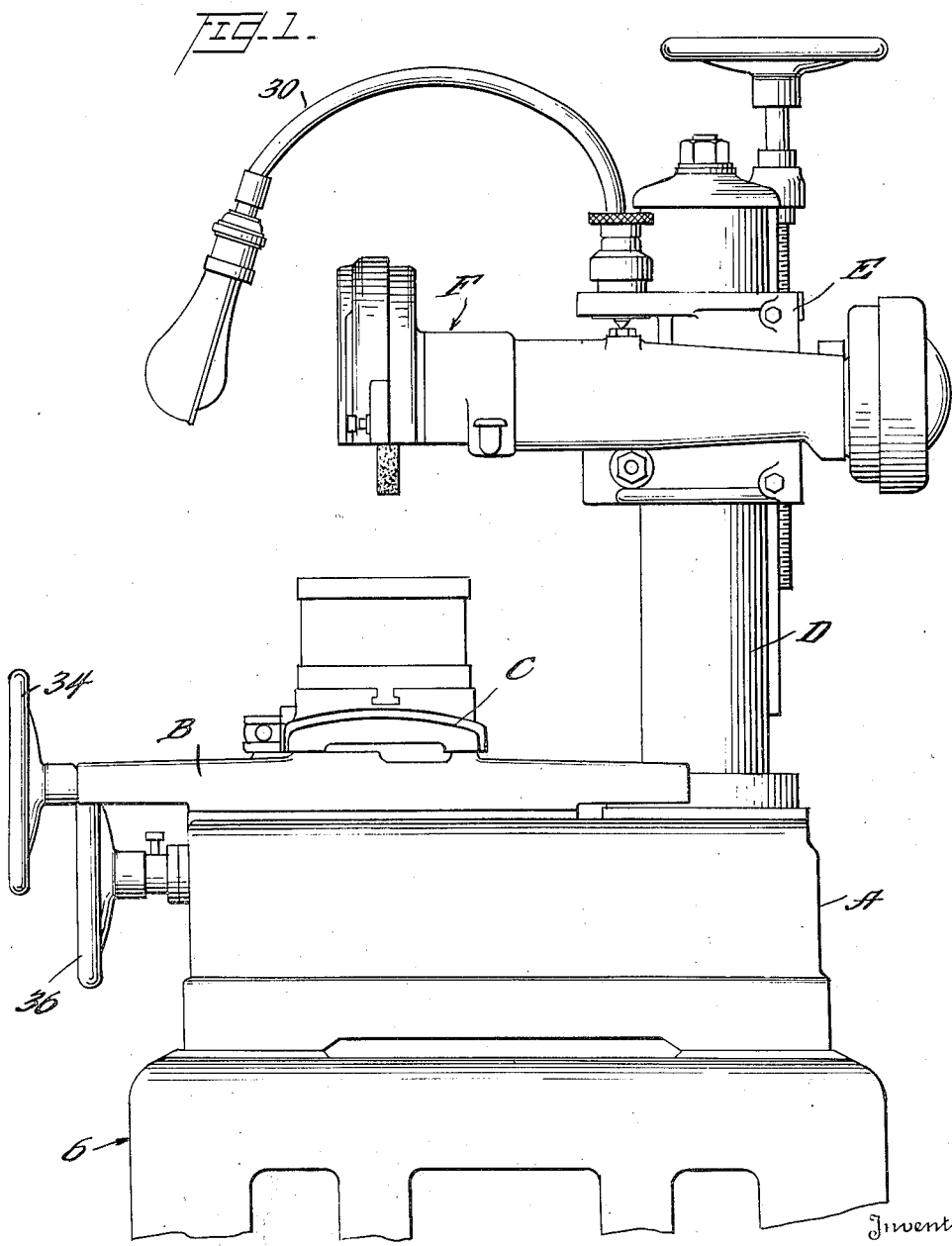
Inventors
Christy A. Wiken
Eric A. Reibig
By Strauch & Hoffman
Attorneys March 26, 1946.   C. A. WIKEN ET AL   2,397,178
MACHINE TOOL SPINDLE MOUNTING AND LUBRICATION SYSTEM
Original Filed Dec. 1, 1942   2 Sheets-Sheet 2
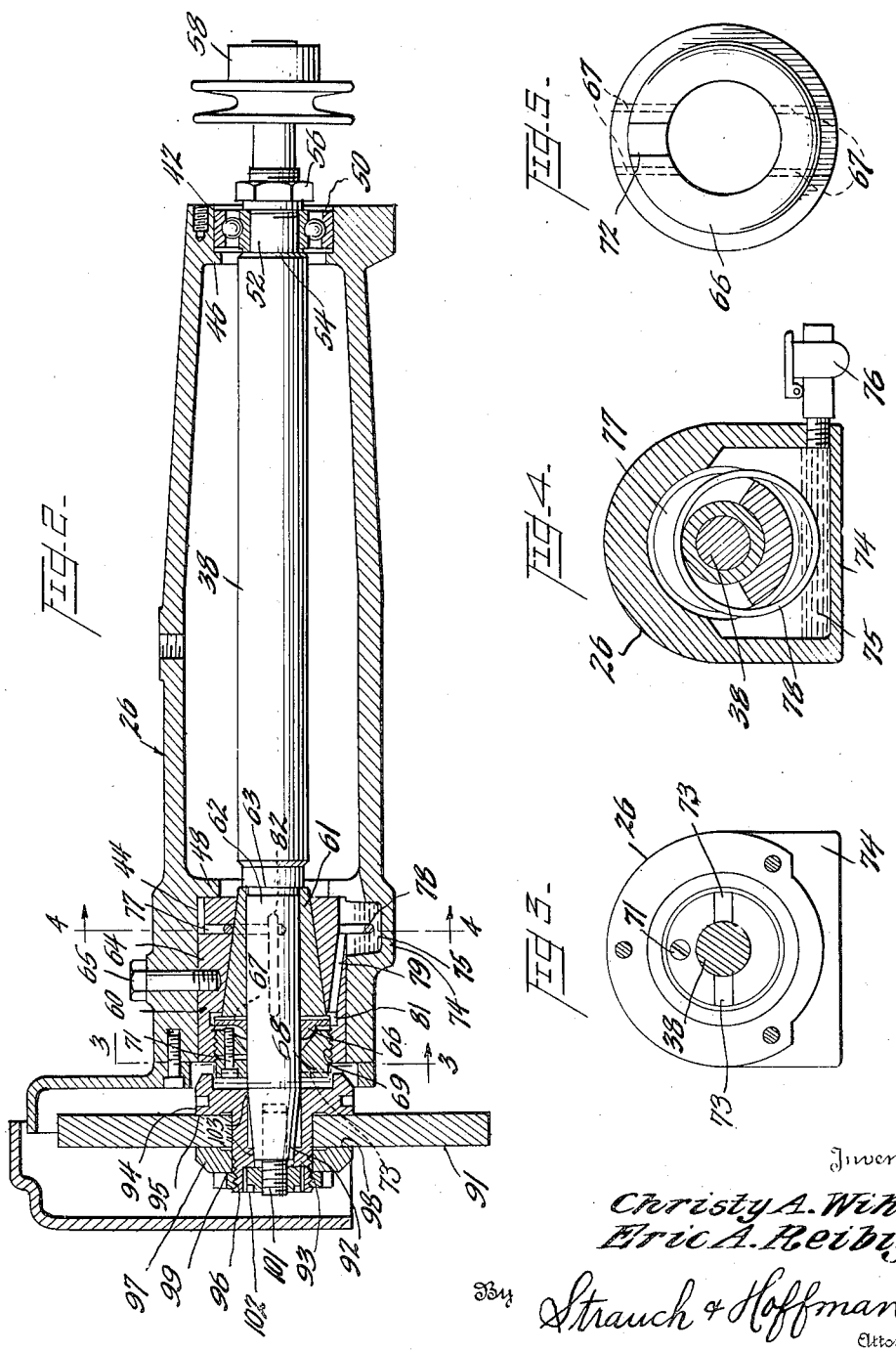
Inventors
Christy A. Wiken
Eric A. Reibig
By Strauch & Hoffman
Attorneys Patented Mar. 26, 1946

2,397,178

UNITED STATES PATENT OFFICE 2,397,178

MACHINE-TOOL SPINDLE MOUNTING AND LUBRICATION SYSTEM

Christy A. Wiken and Eric A. Reibig, Milwaukee, Wis., assignors, by mesne assignments, to The Delta Manufacturing Company, Milwaukee, Wis., a corporation of Wisconsin Original application December 1, 1942, Serial No. 467,512. Divided and this application March 27, 1944, Serial No. 528,316

7 Claims. (Cl. 51—92)

This invention relates to machine tools and more particularly to a novel spindle mounting and lubricating structure of particular value in grinding machines. This application is a division of application Serial No. 467,512, filed December 1, 1942, by Christy A. Wiken and Eric A. Reibig, for Machine tools.

Surface grinders or other machine tools designed for accurate work and employing rotating spindles have in the past been extremely expensive because of the complicated, difficult machining operations required to assure true running of the spindle and the necessity of making the supporting parts comparatively heavy to avoid possible inaccuracies due to misalignment of the spindle. Furthermore, spindle mountings for such machines have usually employed relatively large anti-friction bearing assemblies provided with complicated adjusting or take-up means to maintain the spindle in true running relation and to compensate for wear and looseness resulting from use. It has been found that such massive structure and costly machining operations can be obviated if the spindle structure is made in accordance with the present invention and that the accuracy of the work performed by the machine will compare favorably with the more cumbersome and expensive machines.

It is, accordingly, a primary object of the present invention to provide a relatively light weight and inexpensive spindle construction which will have an operative accuracy comparing favorably with the most expensive machine tools and which is extremely durable and resistant to wear incident to ordinary use in machine shops.

It is a further important object of this invention to provide a novel lubricating mechanism for automatically forcing lubricant to and through the major spindle supporting bearing so as to assure proper lubrication of the spindle at all times.

It is another object of this invention to provide a novel mounting and support assembly for the spindle of a grinding wheel which reduces side and end play to a minimum, assuring accurate and true rotation of the grinding wheel throughout the life of the machine.

It is a further object of this invention to provide a novel self-lubricating bearing assembly for the rotating spindle of a machine tool.

Still another object of the present invention is to provide a simple and effective spindle adjusting means to maintain the spindle against looseness and end play throughout the life of the machine.

Other objects will become apparent from the following detailed description and appended claims when read in conjunction with the attached drawings, wherein:

Figure 1 is a side elevational view of a surface grinding machine employing the spindle mounting of the present invention;

Figure 2 is a longitudinal sectional view of the grinding wheel spindle mount of Figure 1;

Figure 3 is a transverse sectional view on line 3—3 of Figure 2;

Figure 4 is a transverse sectional view on line 4—4 of Figure 2; and

Figure 5 is an elevational view of the thrust washer shown in section in Figure 2.

With continued reference to the drawings in which like reference numerals are used to designate the same parts throughout the several views of the drawings, the present invention is illustrated in connection with the surface grinding machine of the aforementioned co-pending application in which the present invention is particularly useful. The grinder illustrated comprises a base A, a traversing table or cross-slide B, a work supporting table or top slide C parallel to table B, a column D mounted on base A so as to be normal to table C, a slide member or column sleeve E mounted for sliding movement on column D, and a combined motor supporting and spindle housing frame F carried by slide member E and mounted for pivotal movement around an axis parallel to table C. The grinder may be secured to any suitable support such as a table or the like, having a set of supporting legs 6 for example. For a more detailed description of the grinder reference may be had to the above-mentioned co-pending application. It will be appreciated, however, that the present invention may be used in other types of grinders or in other machine tools without departing from the spirit of the present invention.

The novel spindle mounting of the present invention is disposed in housing 26 preferably formed as an integral part of frame F. The housing is elongated and extends across the column to opposite sides thereof.

Referring to Figure 2, housing 26 at its widely spaced opposite ends is provided with accurately machined bearing seats 42 and 44. The inner end of each of these bearing seats is provided with an inwardly directed annular flange respectively designated by reference numerals 46 and 48. A spindle 38 is mounted in housing 26 and adjacent one end is provided with a reduced section 52 forming a shoulder 54. A conventional ball bearing 50 is mounted on section 52 with its inner race clamped between shoulder 54 and a nut 56 threaded onto section 52. The end of spindle 52 beyond nut 56 is still further reduced and is adapted to receive a V-belt pulley wheel 58 secured thereto in any conventional manner. A V-belt (not shown) connects pulley wheel 58 to the pulley wheel of a driving motor (not shown) to establish the driving connection for spindle 38. The outer race of bearing 50 is disposed in seat 42 in spaced relation to shoulder 46. While the outer race fits snugly enough to prevent relative rotational movement between it and seat 42, bearing 50 and spindle 38 are designed for unitary axial movement along seat 42 for a purpose to be presently pointed out.

Between seat 44 and the spindle a tapered bearing assembly 60 is disposed. Bearing assembly 60 comprises a tapered bearing sleeve 61 non-rotatably mounted on a reduced section 62 of spindle 38, preferably by shrinking it tightly into place, with its smaller diameter end in contact with a shoulder 63 at the inner end of reduced section 62; a cooperating oppositely tapered bronze bearing sleeve 64 closely fitting seat 44 with its smaller end in abutting engagement with annular shoulder 48 and held against axial and rotational movement without strain by a cap screw 65 projecting through an opening in housing 26 and threaded into an opening in sleeve 64; a self-aligning bronze thrust washer 66 surrounding reduced section 62 of spindle 38 and having its flat face containing radially extending grooves 67 in engagement with the larger end of sleeve 61 and projecting radially beyond the periphery of the larger end of sleeve 61; a split lock nut 68 threaded into the axially extending annular flange 69 of bearing sleeve 64 with the conical bore in its end engaging the rounded end of thrust washer 66; and a locking screw 71 threaded into lock nut 68 to draw the split section together to lock nut 68 to bearing sleeve 64 and having its end extending into an opening 72 in thrust washer 66 to prevent rotation of the thrust washer.

Bearing assembly 60 is designed to eliminate all end and radial play in spindle 38. This is accomplished, after the bearing parts are assembled with respect to housing 26 and spindle 38 as shown in Figure 2, merely by loosening screw 71, engaging a spanner wrench with notches 73 of nut 68 and threading nut 68 into flange 69 of bearing sleeve 64 thereby forcing thrust washer 66, inner tapered bearing sleeve 61 and spindle 38 to the right in Figure 2 until the tapered bearing surfaces of sleeves 61 and 64 are in proper bearing contact. This movement of spindle 38 is readily permitted due to the sliding relation between seat 42 and the outer race of bearing 50. In making this adjustment care should be exercised to avoid jamming the bearing sleeves 61 and 64 to such an extent that proper bearing action cannot take place.

While bearing assembly 60 may be lubricated in any suitable manner, the present invention provides a novel lubrication system wherein the rotation of the spindle 38 and bearing sleeve 61 assures proper lubrication. In this connection, housing 26 has a substantially rectangular formation 74 on its under surface adjacent the inner end of bearing assembly 60. This formation provides an oil reservoir 75 adapted to be supplied with oil through an oil cup 76. Bearing sleeve 64 is provided with an approximately semi-circular notch 77 extending from the top to a point slightly below the axis of spindle 38 on each side and a slinger ring 78 is disposed in notch 77 so as to rest on the tapered surface of bearing sleeve 61 and dip into the oil in reservoir 75. Notch 77 is of sufficient width to permit free rotation of ring 78 due to its contact with sleeve 61. An oil return duct 79 sloping toward reservoir 75 is formed in bearing sleeve 64 and interconnects an annular chamber 81 formed between the larger end of bearing sleeve 61 and nut 68. In operation slinger ring 78 supplies oil to the tapered surface of bearing sleeve 61, and the centrifugal force due to rotation of sleeve 61 feeds oil along a groove 82 in the tapered bearing surface of bearing sleeve 64, toward the larger end of bearing sleeve 61, lubricating the tapered bearing surface as it passes, and throws oil against the flat face of washer 66. The oil then passes into radial grooves 67 of washer 66 and lubricates the end of bearing sleeve 61 in contact with washer 66, and then passes along grooves 67 into chamber 81 and return duct 79 back to reservoir 75. It will be seen, therefore, that efficient lubrication of bearing assembly 60 is automatically accomplished and that the only attention required is the maintaining of a supply of oil in reservoir 75.

A grinding wheel 91 is mounted on spindle 38 preferably by means of the novel wheel adapter assembly of the aforementioned co-pending application which is mounted on the tapered end 92 of spindle 38 adjacent bearing assembly 60 and due to the novel bearing assembly of this invention is constrained to run true. While any suitable mounting means may be employed for mounting wheel 91 on spindle 38, the present invention contemplates a mounting assembly that will permit removal and replacement of the grinding wheel with full assurance that the grinding wheel will run true when replaced. As a consequence, the present practice of dressing a wheel every time it is removed and replaced is obviated. This novel mounting means comprises an adapter 93 having spaced, tapered spindle engaging portions 103 and a radially extending annular flange 94 having an axially extending rim 95 designed to engage a side face of grinding wheel 91. Adapter 93 is externally threaded at 96 and extends axially beyond the end of spindle 38 a slight distance as clearly shown in Figure 2. An outer wheel flange 97, having an axially extending rim 98 in alignment with rim 95 of adapter 93, fits over the adapter and secures surface wheel 91 on the hub of adapter 93 with rims 95 and 98 in clamping engagement with the side faces of wheel 91, and is secured in place by a nut 99 threaded on the end of the adapter.

Adapter 93 is retained on spindle 38 by means of a headless set screw 101 secured in the end of spindle 38 and a spindle nut 102 threaded on said set screw and seated in an annular recess in adapter 93 with its face in engagement with a radially disposed annular shoulder formed at the inner end of the recess in adapter 93. Removal of wheel 91 and adapter 93 as a unit is readily effected by merely removing lock nut 102. It will be appreciated that no matter how many times this wheel assembly is removed and replaced the relationship between the wheel 91 and adapter 93 and the spindle mounting is never disturbed and that the spaced sloping spindle engaging portions 103 of adapter 93 will act as self-aligning and locating means to position adapter 93 and wheel 91 on the tapered end of spindle 38.

With the above described arrangement, the spindle 38 can readily be maintained against looseness either radially or axially, and the bearing surfaces are adequately lubricated at all times so that there is no tendency for overheating or undue wear of the spindle bearing.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spindle assembly for a grinder or like machine tool, comprising a housing having spaced bearing seats provided at their inner ends with annular shoulders; a spindle having a central body section and reduced end sections forming shoulders at the points of juncture with said body section; a tapered bearing element secured to one of said end sections for rotation with said spindle; a cooperating tapered bearing element secured against rotational and axial movement in one of said bearing seats, with one of its ends disposed in abutting contact with the annular shoulder formed on said bearing seat; means mounting the other end of said spindle for rotation and for axial movement; and means carried by said cooperating tapered bearing section and adapted to move said first-mentioned tapered bearing section and said spindle axially of said housing and said cooperating tapered bearing element for bringing the tapered bearing sections into snug bearing engagement, to eliminate side and end play of said spindle in operation.

2. The combination defined in claim 1, wherein said means comprises a member threadedly engaging said cooperating tapered bearing element and a self-aligning washer interposed between said threaded member and the adjacent end of said first-mentioned tapered bearing element.

3. A bearing assembly for mounting the spindle of a machine tool to avoid end and side play, comprising a housing providing a bearing seat having an inwardly directed annular flange at its inner end; a first bearing element closely fitting said seat, with one end abutting said annular flange, and having an internal tapered bearing surface; an annular axially extending portion formed on the opposite end of said bearing element providing a threaded bore to receive a thrust nut, a second bearing element adapted to fit into and rotate with respect to said first bearing element and providing a tapered bearing surface adapted to coperate with said first-mentioned tapered bearing surface; a thrust nut threaded into said threaded bore for adjusting said bearing elements relatively axially, to take up side and end play; and a thrust washer disposed between said thrust nut and said second bearing element to take the end thrust of said shaft and said second bearing element.

4. In a surface grinding machine or the like a mounting comprising an elongated spindle casing in fixed relation to a portion of said machine; a spindle extending through said casing and having reduced end portions terminated by radial shoulders; a rotary tool on one end of said spindle, a drive pulley on the opposite end of said spindle, an anti-friction bearing assembly between the pulley end of said spindle and said casing; and an adjustable bearing between the wheel end of said spindle and said casing, said adjustable bearing comprising a conical inner bushing fixed on the reduced wheel end portion of said spindle, an outer bushing having a conical aperture receiving said inner bushing, means fixing said outer bushing in said casing, a nut in the larger end of said outer bushing, and a self-aligning thrust washer between said nut and the larger end of said inner bushing.

5. A grinding wheel or like spindle bearing comprising an inner bushing having a frustro conical outer bearing surface and a spindle receiving aperture; an outer bushing having a frustro conical inner bearing surface receiving said inner bushing, an internally screw threaded portion at the larger end of said inner bearing surface, and a generally cylindrical outer surface; an annular nut in the screw threaded portion of said outer bearing; a self-aligning annular thrust washer between said nut and the larger end of said inner bushing; and means for locking said nut in adjusted position.

6. A bearing assembly for mounting the spindle of a machine tool to avoid end and side play, comprising a housing providing a bearing seat having an inwardly directed annular flange at its inner end; a first bearing element closely fitting said seat, with one end abutting said annular flange, and having an internal tapered bearing surface; an annular axially extending portion formed on the opposite end of said bearing element providing a threaded bore to receive a thrust nut; a second bearing element adapted to fit into and rotate with respect to said first bearing element and providing a tapered bearing surface adapted to cooperate with said first mentioned tapered bearing surface and produce centrifugal force to force lubricant along said cooperating bearing surfaces to said threaded bore for lubricating said bearing elements; means for supplying lubricant to a portion of said cooperating bearing surfaces; a thrust nut threaded into said threaded bore for adjusting said bearing elements relatively axially, to take up side and end play; and a non-rotatable thrust washer disposed between said thrust nut and the end face of said second bearing element adjacent said threaded bore to receive lubricant flowing from said bearing surfaces and lubricate the relatively rotatable engaging surfaces of said thrust washer and said second bearing element.

7. A spindle bearing assembly comprising a frusto-conical body rotatable with the spindle; a member having a frusto-conical inner bearing surface receiving said body and an internally threaded end portion spaced from the larger end of said frusto-conical body; a screw threaded bearing adjusting element threaded into said internally threaded end portion and operative to adjust said body axially of said member to tighten said bearing; a self-aligning thrust transmitting washer having a flat face bearing on said larger end of said frusto-conical body and an opposite curved face having a line contact with said bearing adjusting element interposed between said adjusting element and the adjacent end of said body and a single means for locking said adjusting element and said thrust transmitting washer against relative rotation.

CHRISTY A. WIKEN.
ERIC A. REIBIG.